(12) United States Patent
Shimoshimano et al.

(10) Patent No.: US 10,701,716 B2
(45) Date of Patent: Jun. 30, 2020

(54) BASE STATION APPARATUS, TRANSMISSION METHOD, AND RECORDING MEDIUM FOR TRANSMITTING SPEECH INFORMATION

(71) Applicant: JVC KENWOOD Corporation, Yokohama-shi, Kanagawa (JP)

(72) Inventors: Hideo Shimoshimano, Yokohama (JP); Ichiro Shishido, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 16/143,743

(22) Filed: Sep. 27, 2018

(65) Prior Publication Data

US 2019/0098646 A1   Mar. 28, 2019

(30) Foreign Application Priority Data

Sep. 27, 2017   (JP) .................. 2017-186048

(51) Int. Cl.
*H04W 72/12* (2009.01)
*H04W 74/08* (2009.01)
*H04W 52/24* (2009.01)
*H04W 24/02* (2009.01)
*H04L 12/26* (2006.01)
*H04B 17/373* (2015.01)

(52) U.S. Cl.
CPC ...... *H04W 72/1242* (2013.01); *H04B 17/373* (2015.01); *H04L 43/0858* (2013.01); *H04W 24/02* (2013.01); *H04W 52/243* (2013.01); *H04W 72/1221* (2013.01); *H04W 74/085* (2013.01)

(58) Field of Classification Search
None
See application file for complete search history.

(56) References Cited

U.S. PATENT DOCUMENTS

| 2003/0030561 | A1* | 2/2003 | Yafuso | ............... G08B 21/0227 340/573.4 |
| 2019/0313375 | A1* | 10/2019 | Loehr | ................... H04W 72/04 |

FOREIGN PATENT DOCUMENTS

JP        2012-65061        3/2012

\* cited by examiner

*Primary Examiner* — Christine T Duong
(74) *Attorney, Agent, or Firm* — Brundidge & Stanger, P.C.

(57) ABSTRACT

A communication interface receives data at least including speech information and information related to a transmission time when the speech information should be transmitted. A processor extracts the speech information and the transmission time included in the data received by the communication interface. A wireless transmitter transmits the speech information extracted by the processor based on the transmission time extracted by the processor. When the transmission time has already passed, the wireless transmitter transmits the speech information and transmits the speech information extracted from subsequent data that follows said data at a time later than the transmission time extracted from the subsequent data.

8 Claims, 14 Drawing Sheets

FIG.11

| STATUS | TRANSMISSION POWER |
|---|---|
| NORMAL SITUATION | 50W |
| DELAY SITUATION | 25W |

44

BASE STATION APPARATUS, TRANSMISSION METHOD, AND RECORDING MEDIUM FOR TRANSMITTING SPEECH INFORMATION

CROSS-REFERENCE TO RELATED APPLICATION

This application is based upon and claims the benefit of priority from the prior Japanese Patent Application No. 2017-186048, filed on Sep. 27, 2017, the entire contents of which is incorporated herein by reference.

BACKGROUND

1. Field

The present invention relates to communication technology and, more particularly, to a base station apparatus, a transmission method, and a recording medium for transmitting speech information.

2. Description of the Related Art

Improvement in the communication quality in micro base station apparatuses located within a cell built by a wide-area base station apparatus is attempted by containing interference received from wide-area base station apparatuses around and interference affecting wide-area base station apparatuses around. The nearest wide-area base station apparatus is identified from the coordinates of the micro base station apparatus, test transmission is made from the identified wide-area base station apparatus, and the micro base station apparatus measures received power. The micro base station apparatus transmits the measurement result to a higher-level apparatus. The higher-level apparatus calculates an optimal transmission power and a transmission delay parameter in the micro base station apparatus and notifies the micro base station apparatus accordingly (see, for example, patent document 1).

[patent document 1] JP2012-65061

This process is based on the result of preliminary measurement performed between base station apparatuses. In the related art technology, however, a network delay between the base station apparatuses is not sufficiently considered. In the case the base station apparatuses are connected to an Internet Protocol (IP) network, for example, delays that defy accurate prediction or measurement occur. If an unpredictable delay occurs, the communication quality may be lowered. Measures to inhibit the impact of such a network delay, if they should occur, are called for.

SUMMARY

A base station apparatus according to an embodiment of the present invention includes: a receiver that receives data at least including speech information and information related to a transmission time when the speech information should be transmitted; a processor that extracts the speech information and the transmission time included in the data received by the receiver; and a transmitter that transmits the speech information extracted by the processor based on the transmission time extracted by the processor. When the transmission time has already passed, the transmitter transmits the speech information and transmits the speech information extracted from subsequent data that follows said data at a time later than the transmission time extracted from the subsequent data.

Another embodiment of the present invention relates to a transmission method. The method includes: receiving data at least including speech information and information related to a transmission time when the speech information should be transmitted; extracting the speech information and the transmission time included in the data received; and transmitting the speech information extracted based on the transmission time extracted. When the transmission time has already passed, the transmitting transmits the speech information and transmits the speech information extracted from subsequent data that follows said data at a time later than the transmission time extracted from the subsequent data.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 11 shows a data structure of a transmission power configuration table stored in the storage of FIG. 8;

DETAILED DESCRIPTION

Figure 1:
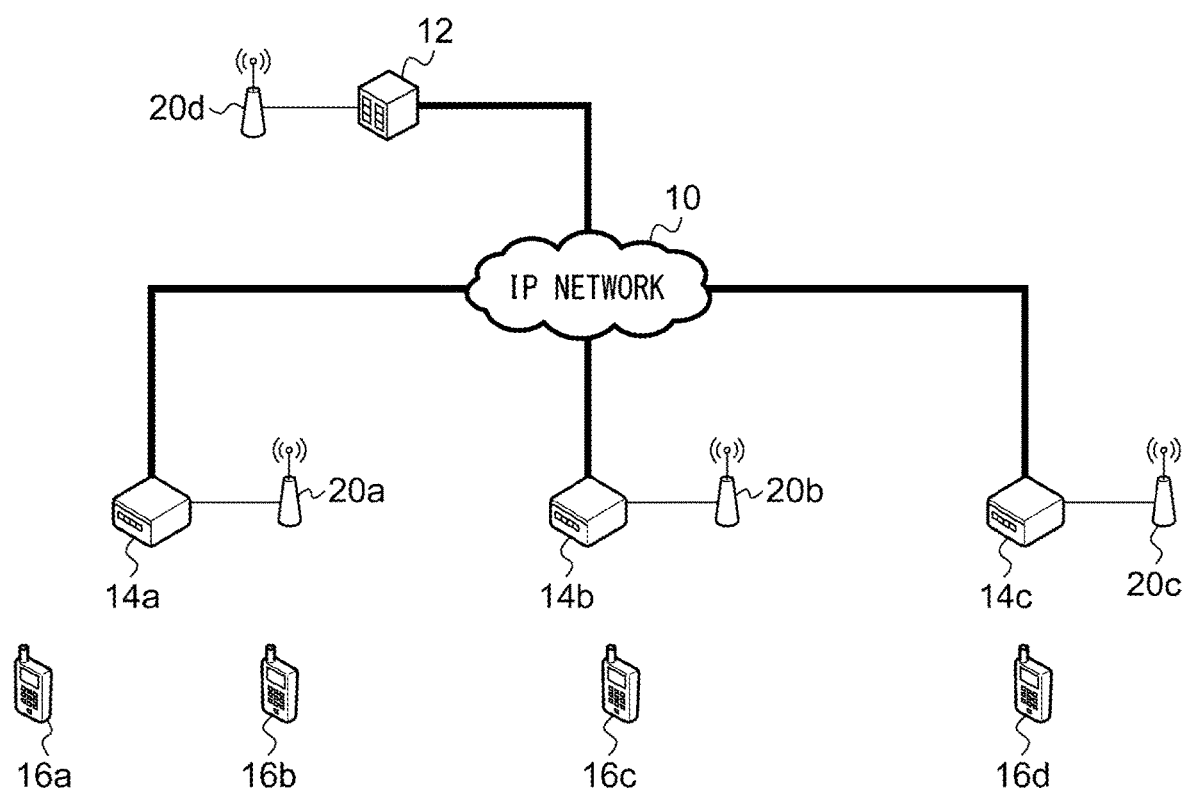
FIG. 1 shows a configuration of a communication system according to the embodiment.

The invention will now be described by reference to the preferred embodiments. This does not intend to limit the scope of the present invention, but to exemplify the invention.

A summary of the prevent invention will be given before describing the invention in specific detail. An embodiment relates to a communication system including a plurality of terminal apparatuses configured to communicate with each other via a base station apparatus. The communication system is compatible with, for example, a professional radio system. The frequency of an uplink from a terminal apparatus to a base station apparatus (hereinafter, "uplink frequency") and the frequency of a downlink from a base station apparatus to a terminal apparatus (hereinafter, "downlink frequency") are different. The uplink frequency corresponds to the reception frequency in the base station apparatus, and the downlink frequency corresponds to the transmission frequency in the base station apparatus. The uplink frequencies in a plurality of base station apparatuses are identical, and the downlink frequencies in a plurality of base station apparatuses are also identical. Hereinafter, a combination of one uplink frequency and one downlink frequency may be referred to as "channel", but only one of the uplink frequency and the downlink frequency may also be referred to as "channel". The plurality of base station apparatuses are connected to a control apparatus. The control apparatus controls the base station apparatuses, and when a base station apparatus receives call information (transmission information) from a terminal apparatus, the control apparatus transfers the received call information to the plurality of base station apparatuses. This is equivalent to execution of simulcast communication across a plurality of base station apparatuses.

One terminal apparatus transmits call information including speech information. One or more base station apparatuses receiving the call information generates a packet signal by turning the call information into an IP packet and transmits the packet signal to the control apparatus via the IP network. The control apparatus generates a packet signal including information related to the time that the base station apparatus should transmit the call information (hereinafter, referred to as "transmission time") and the call information. The control apparatus transmits the packet signal to the plurality of base station apparatuses via the IP network. Upon receiving the packet signal, the plurality of base station apparatuses transmit the call information when the transmission time included in the packet signal arrives. The plurality of terminal apparatuses receive the call information and play back the speech. This process is repeated periodically as long as the speech of the user using the one terminal apparatus continues. In the following description, the data exchanged between the control apparatus and the base station apparatus will be referred to as "packet signal" but may also be referred to as "packet" or "packet data" simply.

When a delay occurs in one of the routes from the control apparatus to the plurality of base station apparatuses, only one of the base station apparatuses receives the call information with a delay. When the transmission time has already passed when the one base station apparatus receives the packet signal, the one base station apparatus transmits the call information with a delay from the transmission time. As described above, the one base station apparatus periodically receives subsequent packet signals following the packet signal received with a delay. In this process, if a delay does not occur in a subsequent packet signal, the base station apparatus may be transmitting the previous call information when the transmission time included in the subsequent packet signal arrives. In this case, the transmission of the previous call information and the transmission of the call information corresponding to the speech information included in the subsequent packet signal overlap so that the call information cannot be properly transmitted.

This embodiment provides for processing steps in preparation for a failure to receive the packet signal in the one base station apparatus due to a delay in the IP network. The base station apparatus measures a time difference between the time that the packet signal is received (hereinafter, referred to as "reception time") and the transmission time included in the packet signal as a delay duration. Further, the base station apparatus transmits the speech information included in the subsequent packet signal at the time derived from delaying the transmission time by the delay duration (hereinafter, referred to as "delayed transmission time") This maintains the continuity of the call information in the event of a delay in the IP packet signal.

FIG. 1 shows a configuration of a communication system 100. The communication system 100 includes an IP network 10, a control apparatus 12, a first base station apparatus 14a, a second base station apparatus 14b, and a third base station apparatus 14c, which are generically referred to as base station apparatuses 14, a first terminal apparatus 16a, a second terminal apparatus 16b, a third terminal apparatus 16c, and a fourth terminal apparatus 16d, which are generically referred to as terminal apparatuses 16, and a first synchronization control reference apparatus 20a, a second synchronization control reference apparatus 20b, a third synchronization control reference apparatus 20c, and a fourth synchronization control reference apparatus 20d, which are generically referred to as synchronization control reference apparatuses 20. The number of base station apparatuses 14 included in the communication system 100 is not limited to "3", and the number of terminal apparatuses 16 is not limited to "4". A larger or smaller number of base station apparatuses 14 or terminal apparatuses 16 may be included.

As described above, the plurality of terminal apparatuses 16 and the plurality of base station apparatuses 14 are compatible with the professional radio system. Each terminal apparatus 16 performs speech communication via one of the base station apparatuses 14. Each terminal apparatus 16 is provided with a push to talk (PTT) button, and the terminal apparatus 16 in which the PTT button is pressed transmits the speech of a user to the base station apparatus 14 as call information. When the base station apparatus 14 receives the call information from the terminal apparatus 16, the base station apparatus 14 generates a packet signal including the call information and transmits the packet signal to the control apparatus 12 via the IP network 10.

The control apparatus 12 generates the transmission time for the call information included in the packet signal and transmits a packet signal including the transmission time and the call information to the plurality of base station apparatuses 14 via the IP network 10. The fourth synchronization control reference apparatus 20d is connected to the control apparatus 12. The fourth synchronization control reference apparatus 20d is, for example, a high-precision Network Time Protocol (NTP) server or a Global Positioning System (GPS) receiver. The fourth synchronization control reference apparatus 20d generates the time that serves as a reference (hereinafter, referred to as "reference time"), and the control apparatus 12 generates the transmission time based on the reference time.

Upon receiving the packet signal, the plurality of base station apparatuses 14 extract the transmission time and the call information from the packet signal. The synchronization control reference apparatus 20 is also connected to each base station apparatus 14, and the base station apparatus 14 transmits the call information when the reference time acquired from the synchronization control reference apparatus 20 passes the transmission time. Since the first synchronization control reference apparatus 20a through the fourth synchronization control reference apparatus 20d are synchronized, the first base station apparatus 14a through the third base station apparatus 14c transmit the call information at the same point of time. Therefore, the communication system 100 can be said to be a simulcast system. The terminal apparatus 16 receives the call information from the base station apparatus 14.

Figure 2:
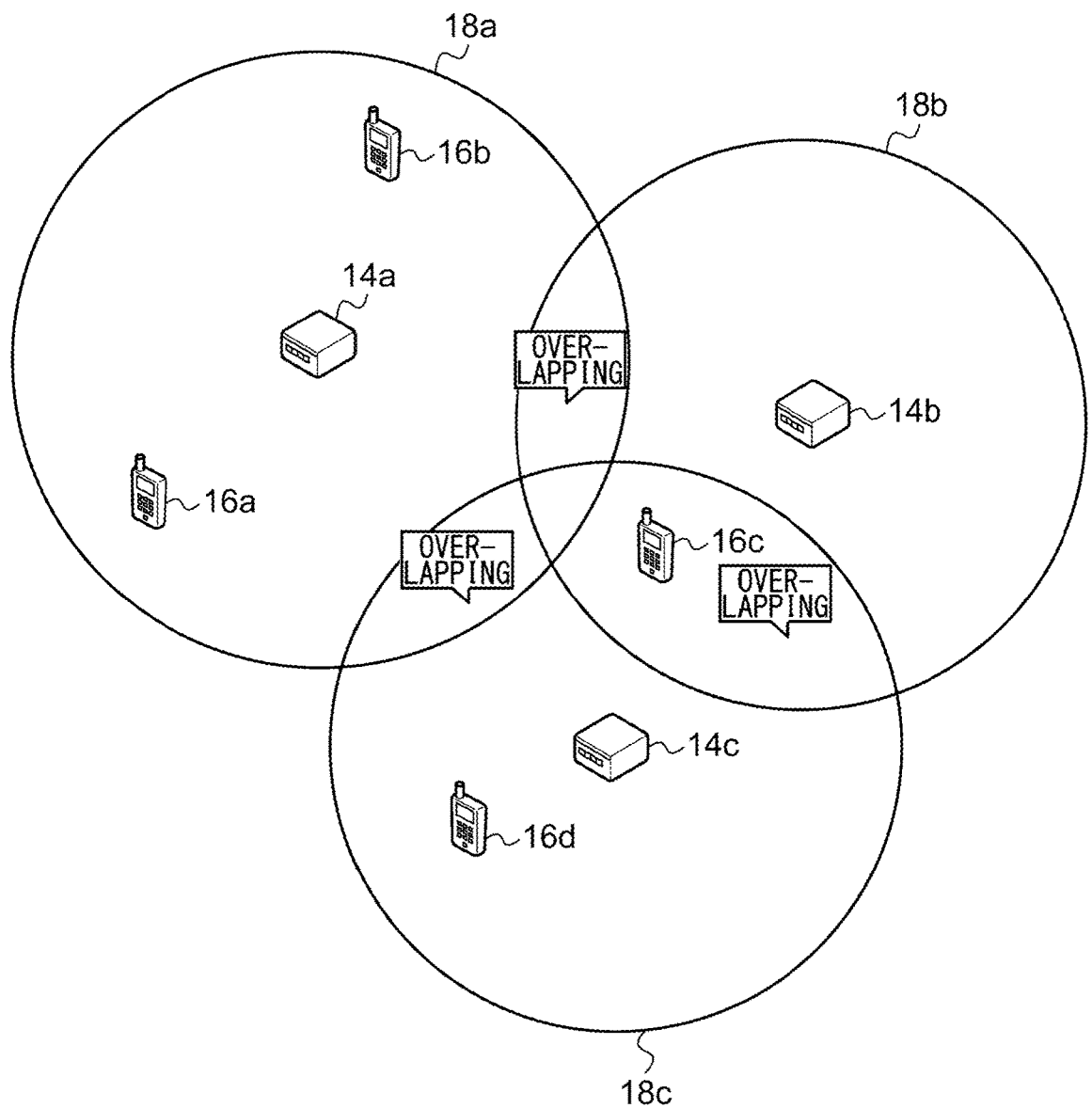
FIG. 2 shows an arrangement of communication areas in the communication system of FIG. 1.

FIG. 2 shows an arrangement of communication areas in the communication system 100. Each base station apparatus 14 forms a communication area 18 as an area where communication is enabled. To describe it in further details, the first base station apparatus 14a forms a first communication area 18a, the second base station apparatus 14b forms a second communication area 18b, and the third base station apparatus 14c forms a third communication area 18c. Further, since the first base station apparatus 14a through the third base station apparatus 14c use the same channel, the same channel is also used in the first communication area 18a through the third communication area 18c. Thus, in the communication system 100 configured as a simulcast system, it is necessary to align the timing of transmission from the base station apparatuses 14 so as not to interfere the terminal apparatuses 16 because the same channel is also used in portions where a plurality of communication areas 18 overlap.

Figure 3:
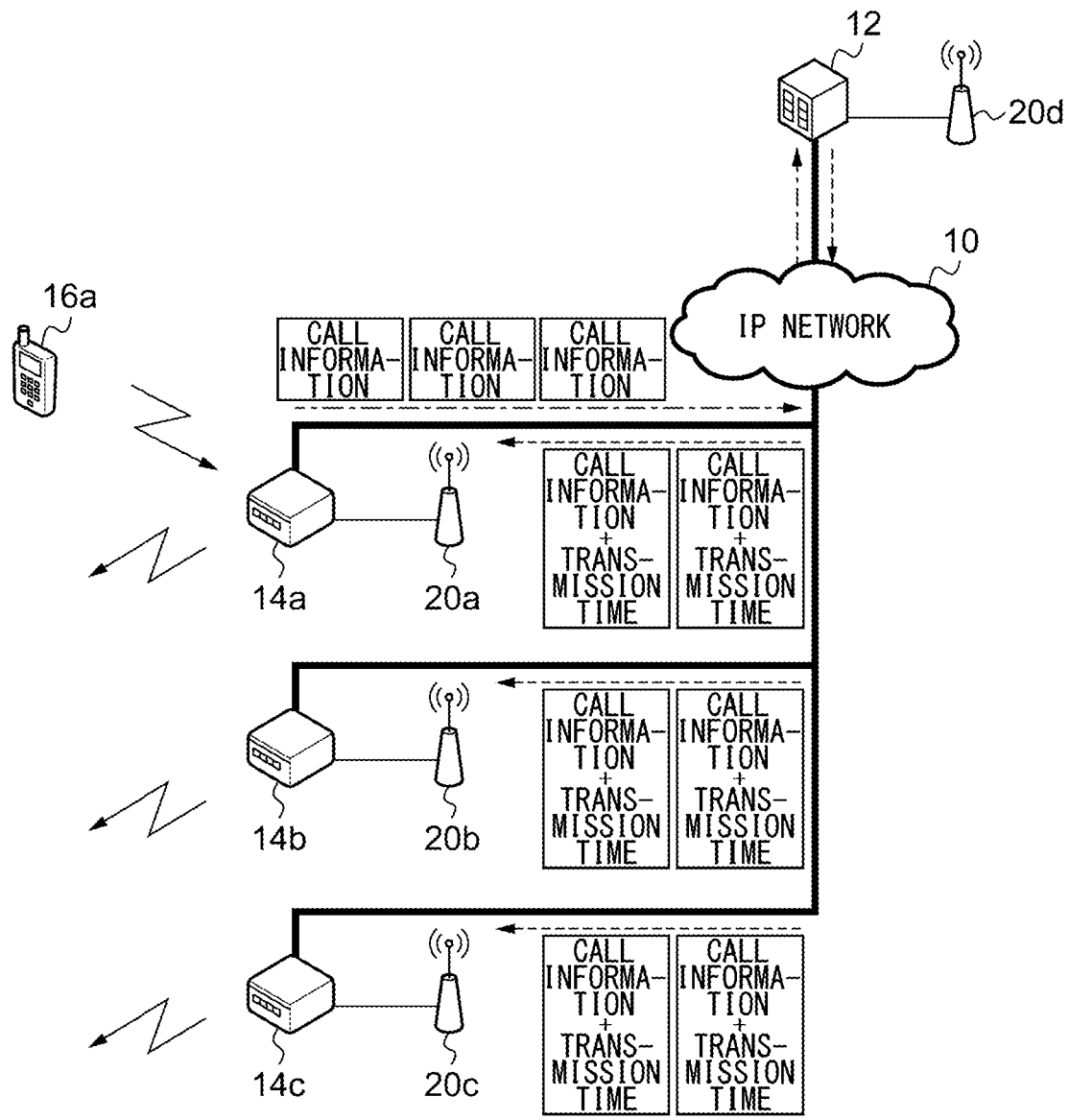
FIG. 3 shows a summary of a process in the communication system of FIG. 1.

FIG. 3 shows a summary of a process in the communication system 100. The first terminal apparatus 16a transmits call information, and the first base station apparatus 14a receives the call information. The first base station apparatus 14a includes the call information in a packet signal and transmits the packet signal to the control apparatus 12 via the IP network 10 at regular intervals. The control apparatus 12 generates a packet signal including the call information and the transmission time based on the packet signal received from the first base station apparatus 14a and transmits the generated packet signal to the first base station apparatus 14a through the third base station apparatus 14c at regular intervals via the IP network 10. The transmission time is defined for the purpose of aligning the timing of transmission in all base station apparatuses 14 and so has the same value for all base station apparatuses 14. Further, the transmission time is configured to have a value that allows for a certain delay time in the IP network 10. When the control apparatus 12 receives a plurality of packet signals including the same call information from a plurality of base station apparatuses 14, the control apparatus 12 selects a packet signal (call information) having the highest quality and generates a packet signal for transmission based on the selected packet signal.

Figure 4:
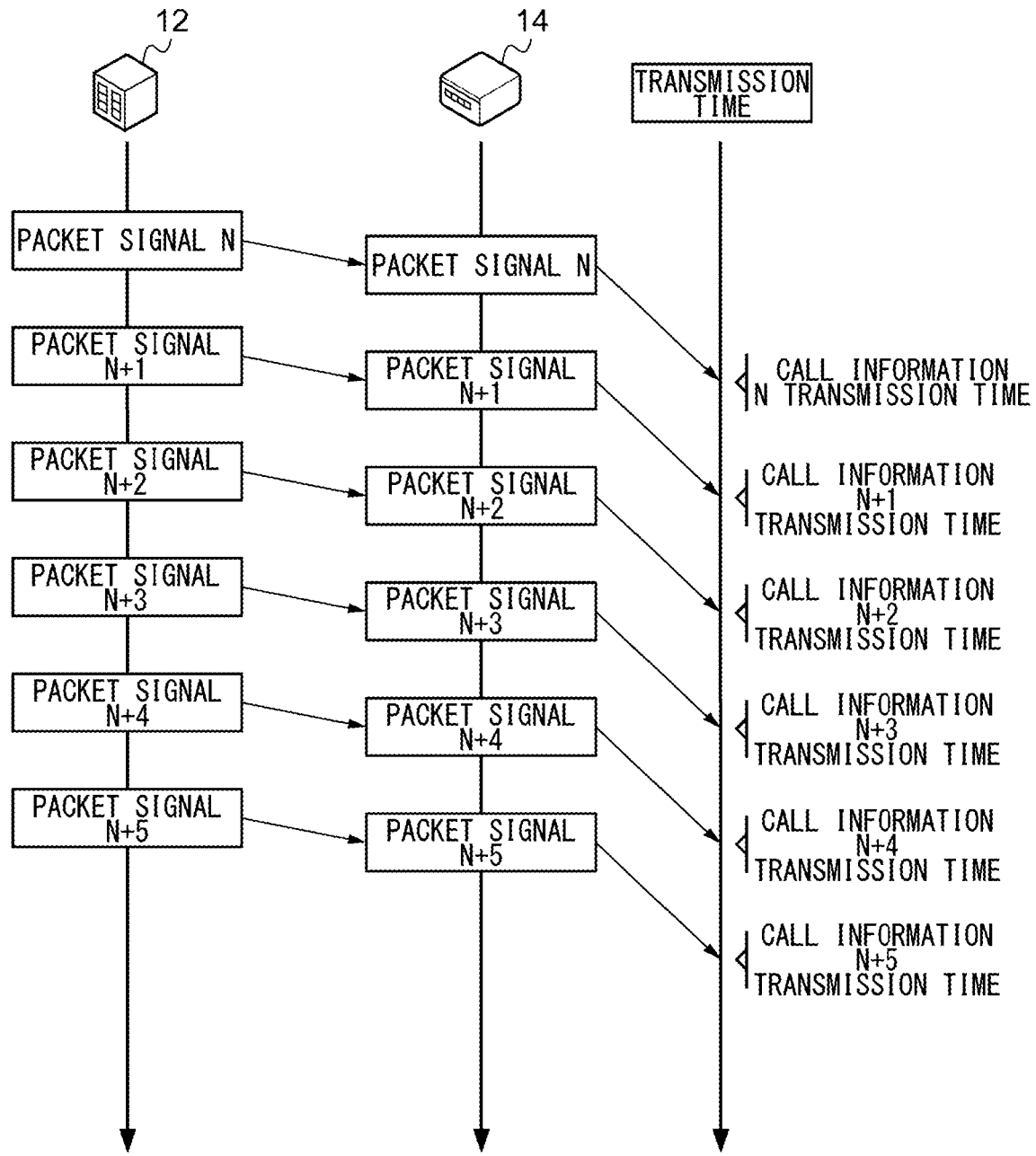
FIG. 4 shows a summary of a transmission process performed by the communication system of FIG. 1.

FIG. 4 shows a summary of a transmission process performed by the communication system 100. The control apparatus 12 transmits a packet signal N through a packet signal N+5 to the base station apparatus 14 at regular intervals. The base station apparatus 14 stores the packet signals in respective buffers and extracts the transmission time included in the packet signals. When the reference time obtained from the synchronization control reference apparatus 20 reaches the transmission time, the base station apparatus 14 transmits the call information. Thus, the call information N through the call information N+5 included in the packet signal N through the packet signal N+5, respectively, are transmitted at regular intervals.

Figure 5:
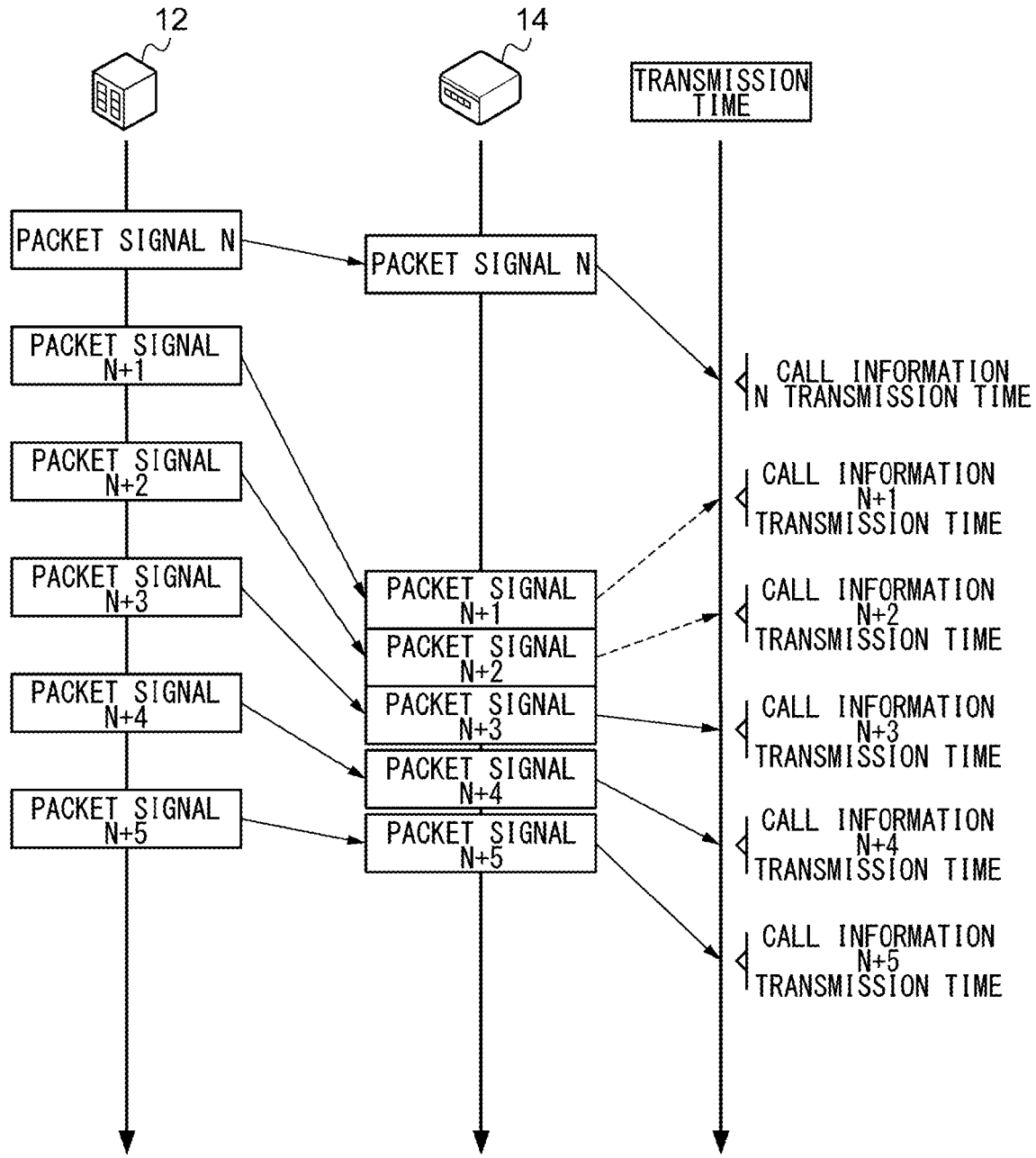
FIG. 5 shows a problem caused when a delay occurs in the IP network in the communication system of FIG. 1.

FIG. 5 shows a problem caused when a delay occurs in the IP network in the communication system 100. As described above, an unexpected network delay may occur in the IP network 10 by its nature. The network delay is affected by how the circuit is built to provide the service (best effort/ guaranteed, etc.) or the condition of traffic. It is extremely difficult to predict the network delay accurately. When an unexpected network delay occurs in the packet signal N+1 that the control apparatus 12 transmitted to the base station apparatuses 14, the base station apparatuses 14 cannot receive the packet signal before the transmission time configured in the control apparatus 12. When the base station apparatus 14 cannot receive the packet signal N+1 before the transmission time and when the base station apparatus 14 transmits the call information N+1 immediately after the packet signal N+1 is received, the transmission time of the call information N+2 will arrive before the transmission of the call information N+1 is completed. When the call information N+2 is transmitted at the designated transmission time, the continuity of the call information will not be maintained. Further, the transmission like this produces a difference in the timing of transmission from another base station apparatus 14, resulting in interference in a portion overlapping the communication area 18 of another base station apparatus 14.

Figure 6:
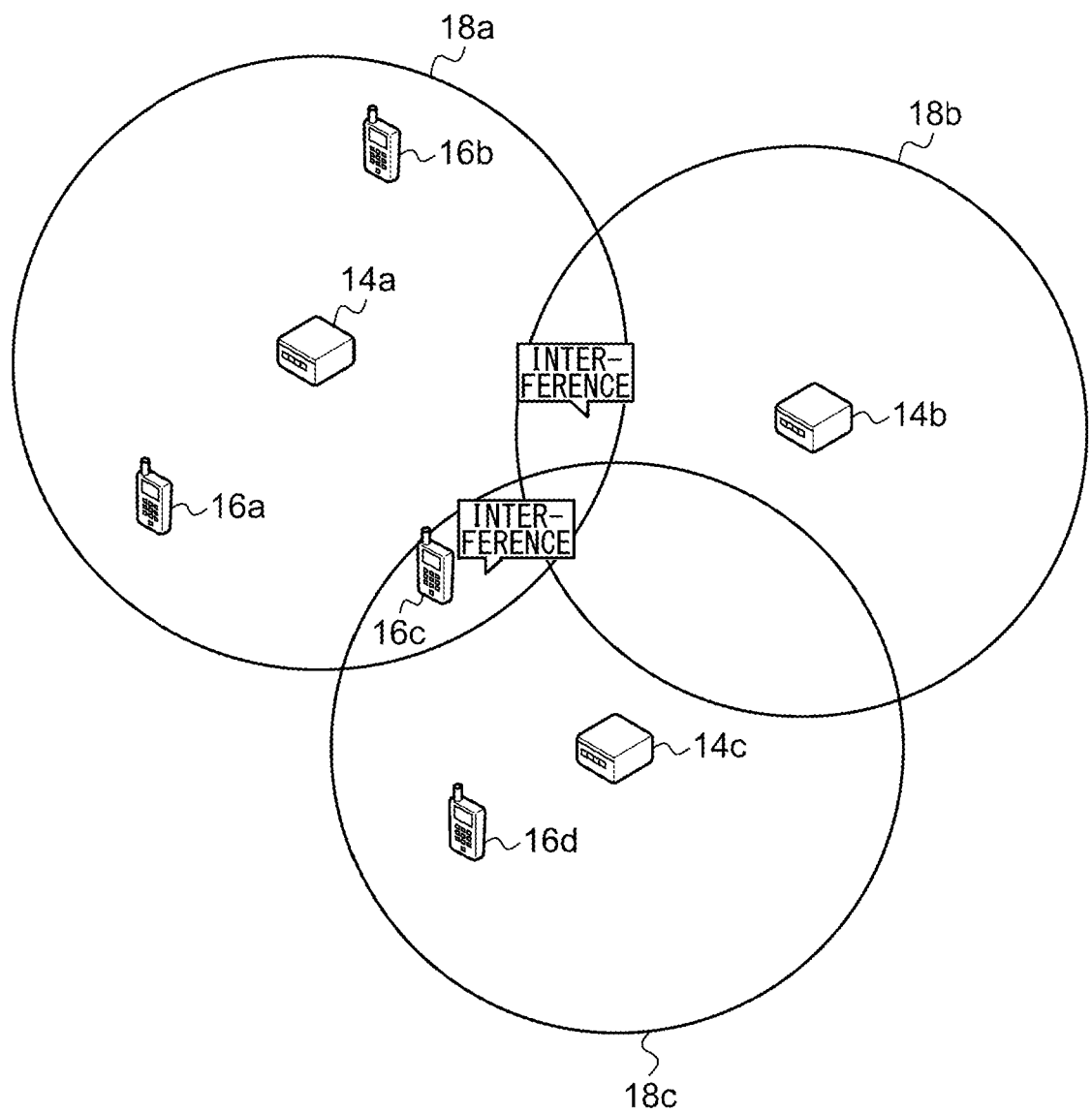
FIG. 6 shows a problem that can occur in the communication area in the situation shown in FIG. 5.

FIG. 6 shows a problem that can occur in the communication area in the situation shown in FIG. 5. The first base station apparatus 14a corresponds to the base station apparatus 14 of FIG. 5. When the first base station apparatus 14a transmits the call information N+1 after the transmission time of the call information N+1, interference occurs in a portion where the first communication area 18a and the second communication area 18b overlap and in a portion where the first communication area 18a and the third communication area 18c overlap.

Figure 7:
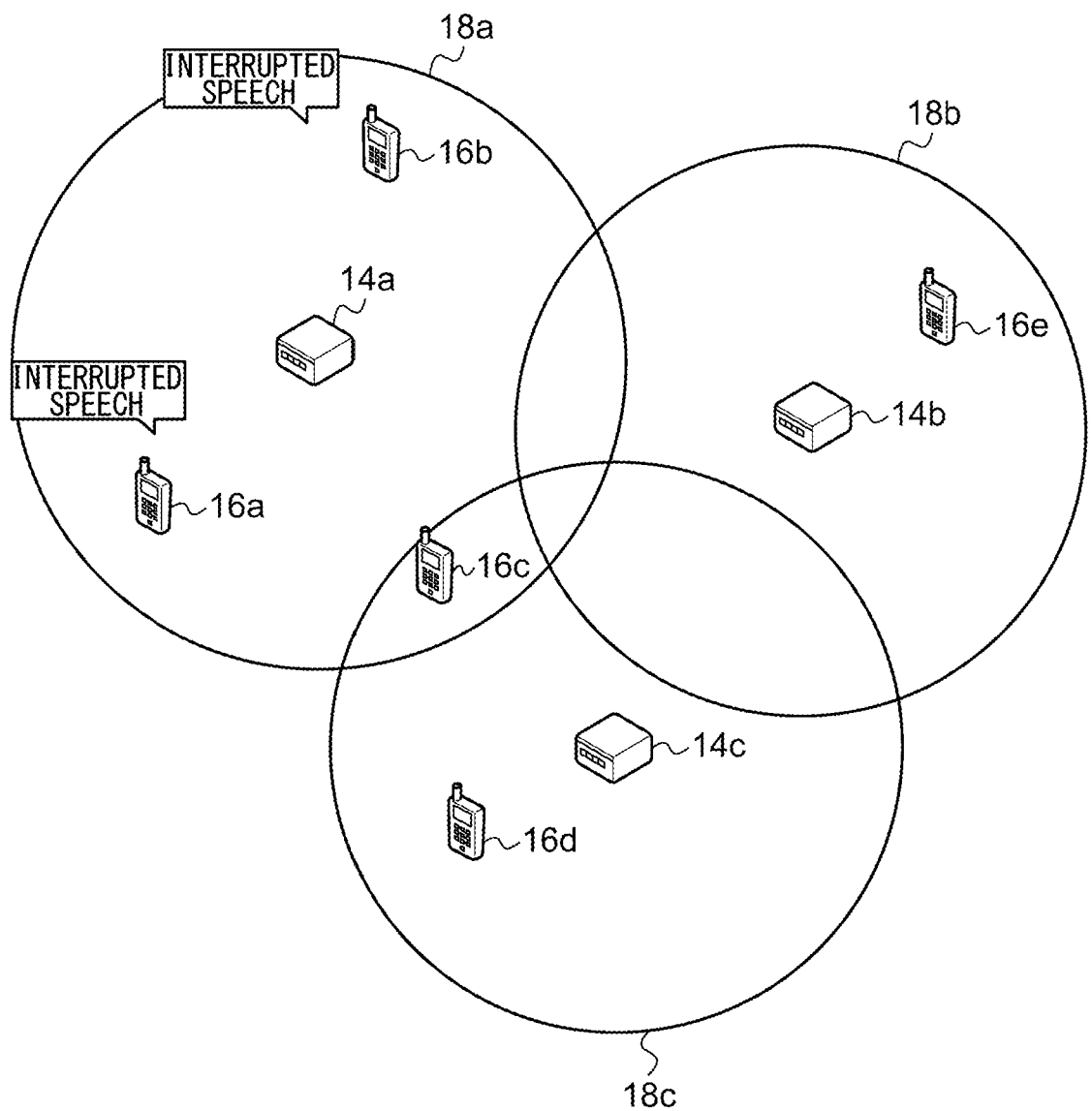
FIG. 7 shows another problem that can occur in the communication area when the situation shown in FIG. 5 occurs.

FIG. 7 shows another problem that can occur in the communication area 18 when the situation shown in FIG. 5 occurs. The illustration in FIG. 7 is similar to that of FIG. 6. When the first base station apparatus 14a was not able to receive the packet signal N+1 before the call information N+1 transmission time, the first base station apparatus 14a may conceivably discard the packet signal N+1 and not transmit the call information N+1. This results in interrupted speech in the first terminal apparatus 16a and the second terminal apparatus 16b located only in the first communication area 18a. The transmission time is configured to have a value that allows for the delay time in the IP network 10 in the communication system 100 as a whole. When a certain abrupt network delay is predicted and the transmission time is delayed accordingly, the time required for the base station apparatuses 14 to perform a transmission process will be increased proportionately. This increases the delay in a call between the terminal apparatuses 16, which is not favorable.

Figure 8:
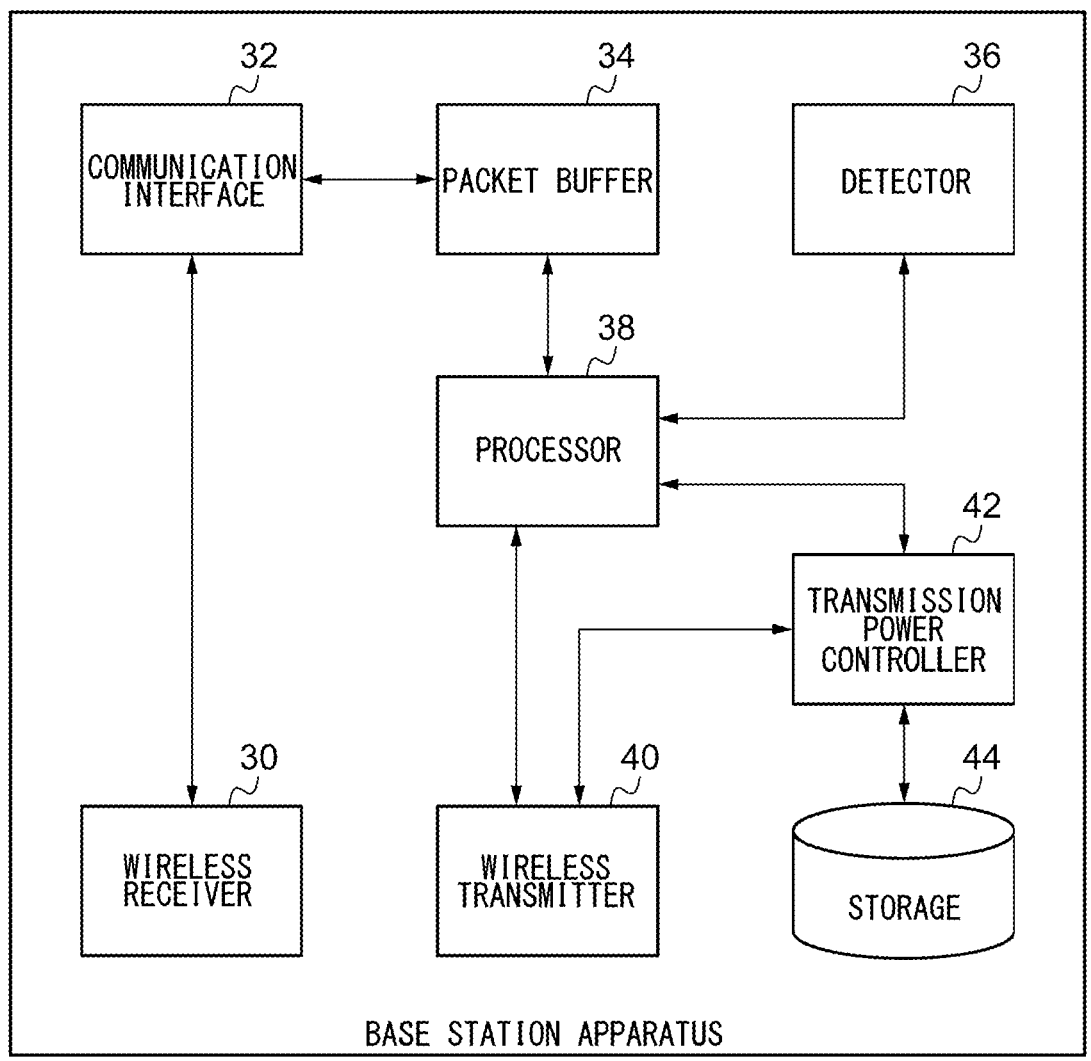
FIG. 8 shows a configuration of the base station apparatus of FIG. 1.

FIG. 8 shows a configuration of the base station apparatus 14. The base station apparatus 14 includes a wireless receiver 30, a communication interface 32, a packet buffer 34, a detector 36, a processor 38, a wireless transmitter 40, a transmission power controller 42, and a storage 44. By performing a reception process compatible with a professional radio system, the wireless receiver 30 receives a signal from the terminal apparatus 16. When the wireless receiver 30 receives call information from one terminal apparatus 16, the wireless receiver 30 outputs the call information to the communication interface 32. The call information includes speech information. Upon receiving the call information from the wireless receiver 30, the communication interface 32 generates a packet signal including the call information. The communication interface 32 is connected to the IP network 10 of FIG. 1 and transmits the packet signal to the control apparatus 12 via the IP network 10. The communication interface 32 can be said to be a network transmitter when performing such a transmission process.

Upon receiving a packet signal from the control apparatus 12 via the IP network 10, the communication interface 32 outputs the packet signal to the packet buffer 34. The communication interface 32 can be said to be a network receiver when performing such a reception process. A reception process is performed even when a transmission process is not being performed. The packet signal includes the call information and the information related to the transmission time that the call information should be transmitted. The transmission time is assigned by the control apparatus 12 of FIG. 1 such that regular intervals occur between packet signals.

The packet buffer 34 stores the packet signals in sequence. The detector 36 is connected to the synchronization control reference apparatus 20 of FIG. 1 and acquires the reference time from the synchronization control reference apparatus 20 in sequence. The processor 38 extracts the call information and the transmission time included in the packet signal stored in the packet buffer 34. When the reference time reaches the transmission time, i.e., when the transmission time arrives, the processor 38 outputs the call information to the wireless transmitter 40.

The wireless transmitter 40 transmits a signal by performing a transmission process compatible with a professional radio system. The wireless transmitter 40 transmits the call information when it receives the call information from the processor 38. When the call information has been transmitted from the wireless transmitter 40, the processor 38 directs the packet buffer 34 to delete the packet signal corresponding to the call information. In accordance with this direction, the packet buffer 34 deletes the packet signal.

Figure 9:
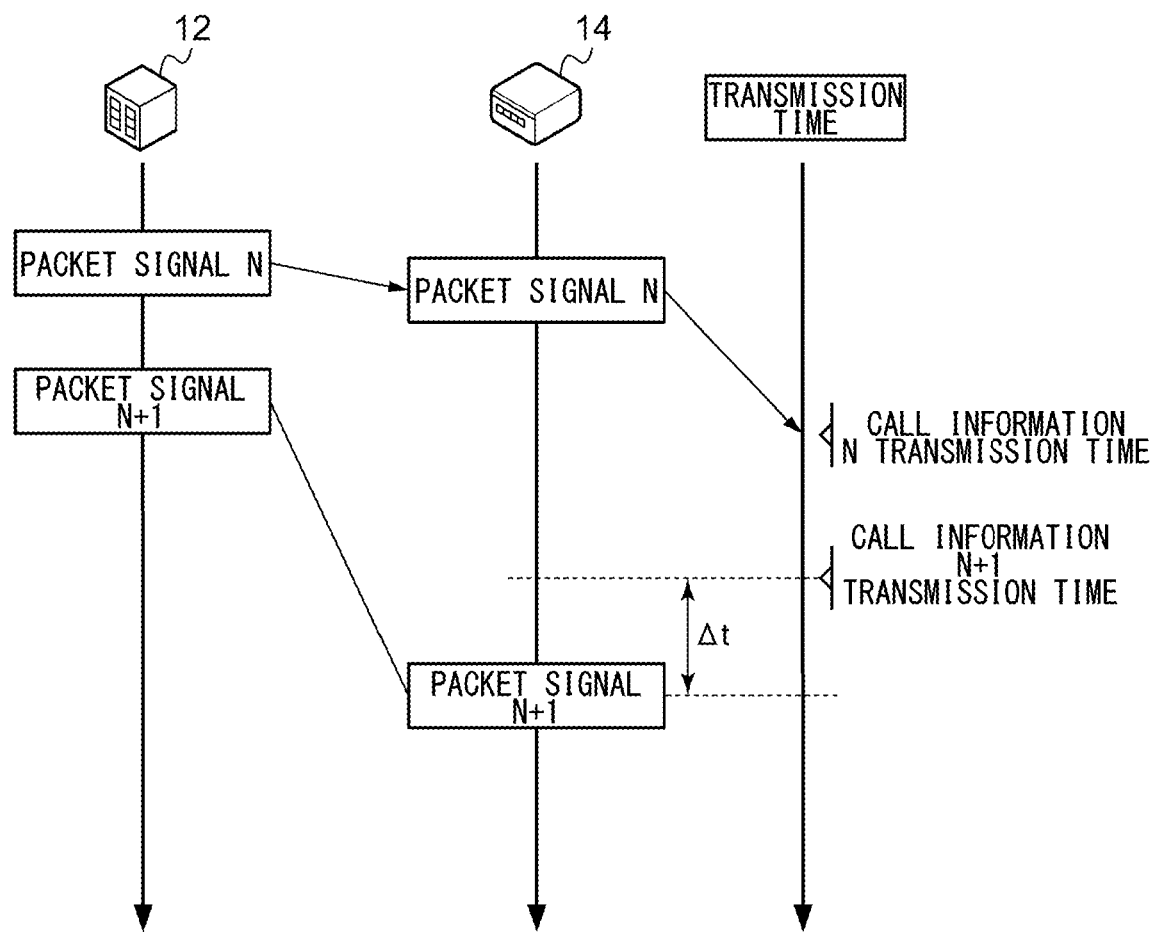
FIG. 9 shows a summary of a transmission process performed by the communication system of FIG. 1.

On the basis of this basic process, the process performed when a delay occurs in the IP network 10 will be described. In the event of a delay, the processor 38 confirms that the reference time is ahead of the transmission time extracted from the packet signal, i.e., that the transmission time has already passed. When the processor 38 confirms that the transmission time has already passed, the processor 38 derives a delay duration elapsed since the transmission time (delay time). FIG. 9 will be used to describe this process. FIG. 9 shows a summary of a transmission process performed by the communication system 100. As in the case of FIG. 5, the delay that occurs in the IP network 10 from the control apparatus 12 to the base station apparatus 14 causes a delay in the reception of the packet signal N+1 in the base station apparatus 14. When the reference time is ahead of the transmission time included in the packet signal, the processor 38 calculates the aforementioned delay duration $\Delta t$ as follows.

$\Delta t$=the reference time occurring when the packet signal is received−the transmission time included in the packet signal Reference is made back to FIG. 8.

Subsequently, the processor 38 outputs the call information extracted from the packet signal for which the transmission time has already passed (hereinafter, referred to as "delayed packet signal") to the wireless transmitter 40. The wireless transmitter 40 transmits the call information. In other words, the call information included in the delayed packet signal is transmitted immediately. The processor 38 extracts the transmission time and the call information from the packet signal following the delayed packet signal. The processor 38 generates a delayed transmission time by adding the delay duration to the transmission time. When the reference time reaches the delayed transmission time, i.e., when the delayed transmission time arrives, the processor 38 determines to transmit the call information extracted from the subsequent packet signal and outputs the call information to the wireless transmitter 40. The wireless transmitter 40 transmits the call information at the delayed transmission time.

Figure 10:
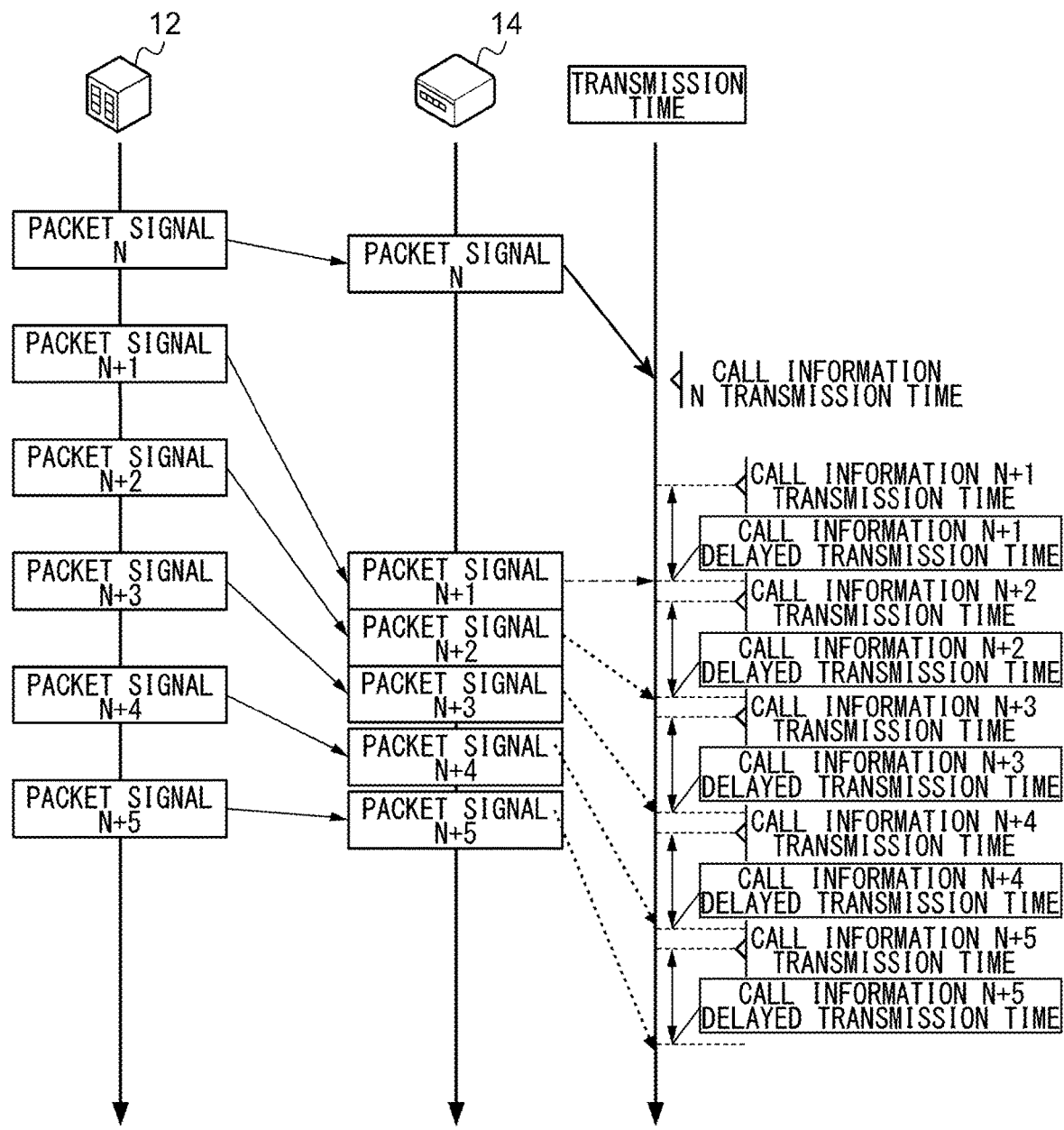
FIG. 10 is another drawing showing a summary of a transmission process performed by the communication system of FIG. 1.

FIG. 10 is another drawing showing a summary of a transmission process performed by the communication system 100. It is also assumed here that the reception of the packet signal N+1 in the base station apparatus 14 is delayed. As described above, the delay duration $\Delta t$ from the transmission time of the call information N+1 in the packet signal N+1 is derived. The call information N+1 in the packet signal N+1 is transmitted at the delayed transmission time of the call information N+1. In the illustrated example, no delays occur in the packet signal N+2 through the packet signal N+5 following the packet signal N+1. The base station apparatus 14 receives each of the packet signals N+2 through N+5 before the transmission time of each packet signal. The base station apparatus 14 does not transmit the call information N+2 at the transmission time of the call information N+2. This is to maintain the continuity between the call information N+1 and the call information N+2. Instead, the delayed transmission time of the call information N+2 is derived by adding the delay duration $\Delta t$ to the transmission time of the call information N+2 included in the subsequent packet signal N+2. The call information N+2 in the packet signal N+2 is transmitted at the delayed transmission time of the call information N+2. A similar process is performed for the packet signal N+3 through the packet signal N+5. In other words, N+2 and the subsequent call information are transmitted at the delayed transmission time derived by using the delay duration $\Delta t$ instead of the transmission time designated by the control apparatus 12. Since the delayed transmission time is determined based on the transmission time included in the packet signal and the delay duration, it can be said that the call information is transmitted based on the transmission time included in the packet signal even when the delayed transmission time is used.

In the event that a delay larger than the delay in the packet signal N+1 occurs in the packet signal subsequent to the packet signal N+1 (e.g., the packet signal N+3), the processor 38 updates the delay duration $\Delta t$ to a delay duration $\Delta t2$. The delay duration $\Delta t2$ is derived for the packet signal N+3 as already described. In other words, when a value (differential value) indicating a time difference derived from subtracting the transmission time included in the packet signal from the reference time occurring when the packet signal is received is larger than the delay duration $\Delta t$, the differential value is defined as the new delay duration $\Delta t2$. N+3 and the subsequent call information are transmitted at the delayed transmission time derived from adding $\Delta t2$ to the transmission time included in the packet signal. Reference is made back to FIG. 8.

In the case a delay occurs in the IP network 10, the following process may be performed to reduce interference between the call information transmitted from the base station apparatus 14 in which the delay occurs and the call information transmitted from the base station apparatus 14 in which a delay does not occur. The storage 44 stores a transmission power configuration table. FIG. 11 shows a data structure of a transmission power configuration table stored in the storage 44. As illustrated, the table lists the transmission power in a normal situation and in a delay situation. The normal situation is when the transmission time is used, and the delay situation is when the delayed transmission time is used. Further, the transmission power in the delay situation is configured to be smaller than the transmission power in the normal situation. Reference is made back to FIG. 8.

The transmission power controller 42 receives information indicating whether a delay occurs from the processor 38. When a delay does not occur, the transmission power controller 42 reads the transmission power in the normal situation from the storage 44 and configures the transmission power in the normal situation in the wireless transmitter 40. When a delay occurs, on the other hand, the transmission power controller 42 reads the transmission power in the delay situation from the storage 44 and configures the transmission power in the delay situation in the wireless transmitter 40. The wireless transmitter 40 transmits the call information with the transmission power controlled by the transmission power controller 42. Therefore, the wireless transmitter 40 uses a smaller transmission power to transmit the call information when the delayed transmission time arrives than to transmit the call information when the transmission time arrives.

Figure 12:
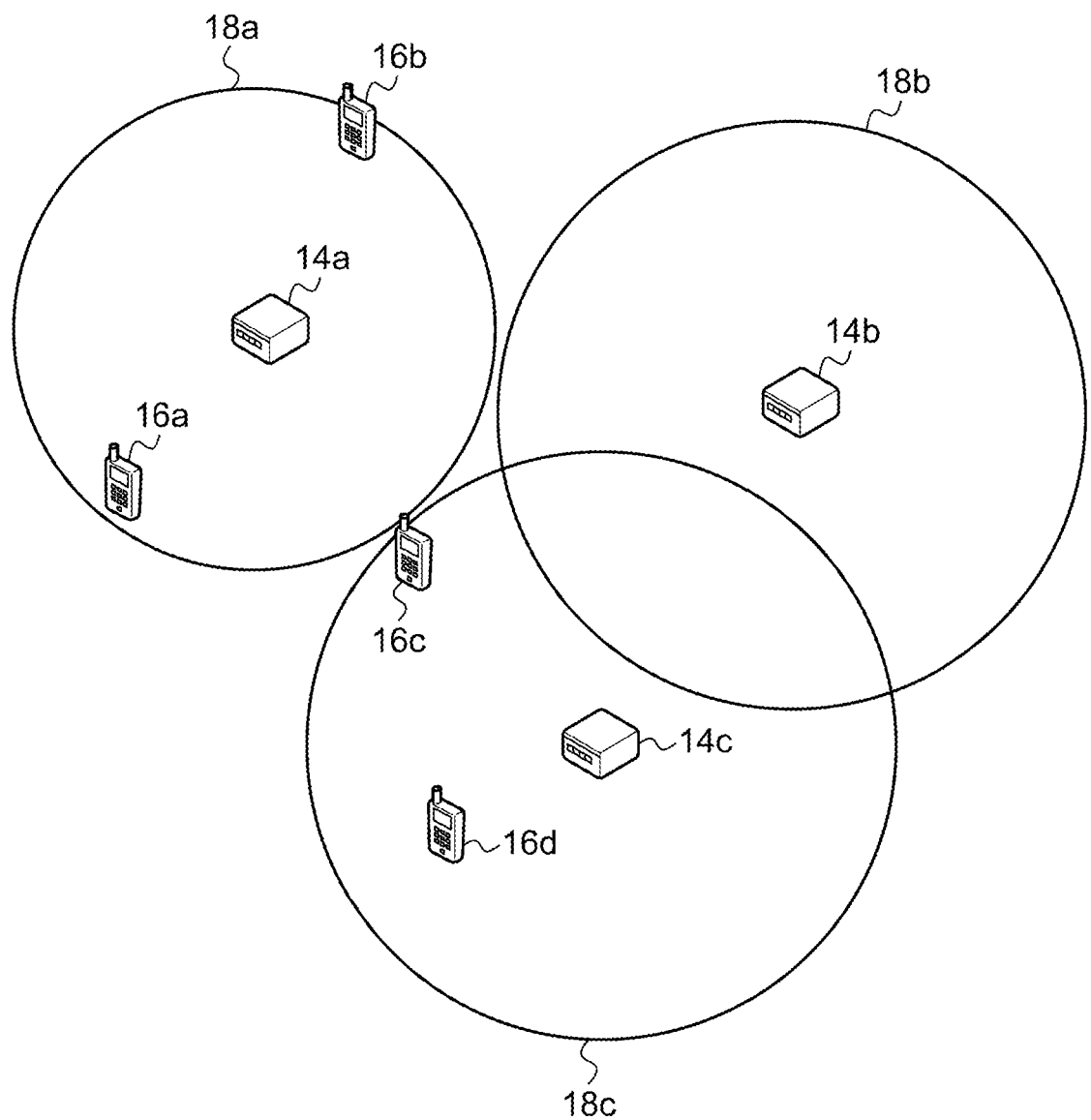
FIG. 12 shows a change in a communication area induced by a process using a transmission power configuration table.

FIG. 12 shows a change in a communication area 18 induced by a process using a transmission power configuration table shown in FIG. 11. It is assumed here that a delay occurs in the first base station apparatus 14a. Therefore, the transmission power of the first base station apparatus 14a is smaller than the transmission power of the second base station apparatus 14b and the third base station apparatus 14c. This causes the first communication area 18a to be smaller than the second communication area 18b and the third communication area 18c. Since the first communication area 18a does not overlap the second communication area 18b and the third communication area 18c, interference between the communication areas is reduced. The first communication area 18a may overlap the second communication area 18b and the third communication area 18c. The thrust is that the area of the overlapping portions in the delay situation is smaller than the area of the overlapping portions in the normal situation.

When a delay occurs in the IP network 10, transmission is performed at the delayed transmission time. The following process may be performed in this state. While the packet signals are transmitted at the delayed transmission time, the processor 38 monitors whether a silent segment is included in the call information extracted from the packet signal stored in the packet buffer 34. When the maximum value or the average value of the speech information included in the call information is equal to or smaller than a predetermined value, it is determined that the call information represents a silent segment. For example, a silent segment is detected in units of the call information included in the packet signal. The call information in the silent segment need not be transmitted so that the processor 38 skips the transmission of the call information.

In this process, the processor 38 directs the packet buffer 34 to delete the packet signal corresponding to the call information. In response to this direction, the packet buffer 34 deletes the packet signal. Further, the processor 38 updates the delay duration Δt by subtracting the time actually required to transmit the deleted call information from the current delay duration Δt.

New Δt=current Δt−time actually required to transmit the deleted call information In other words, the processor 38 reduces the delay duration in accordance with the duration of the silent segment when the silent segment is included in the call information included in the packet signal. Further, the processor 38 acquires the next packet signal from the packet buffer 34 and processes the packet signal as described above. Reduction in the silent segment may be not be made in units of the call information (packet signal), but reduction may be made in units of shorter duration. For example, when the second half of the first call information is a silent segment and the first half of the subsequent, second call information is a silent segment, the silent segments of the two pieces of call information may be deleted, and the first half of the first call information and the second half of the second call information are connected to form one call information. The wireless transmitter 40 transmits the call information in which the silent segment is deleted. Moreover, the wireless transmitter 40 updates the delay time Δt in accordance with the duration of the deleted silent segment.

Figure 13:
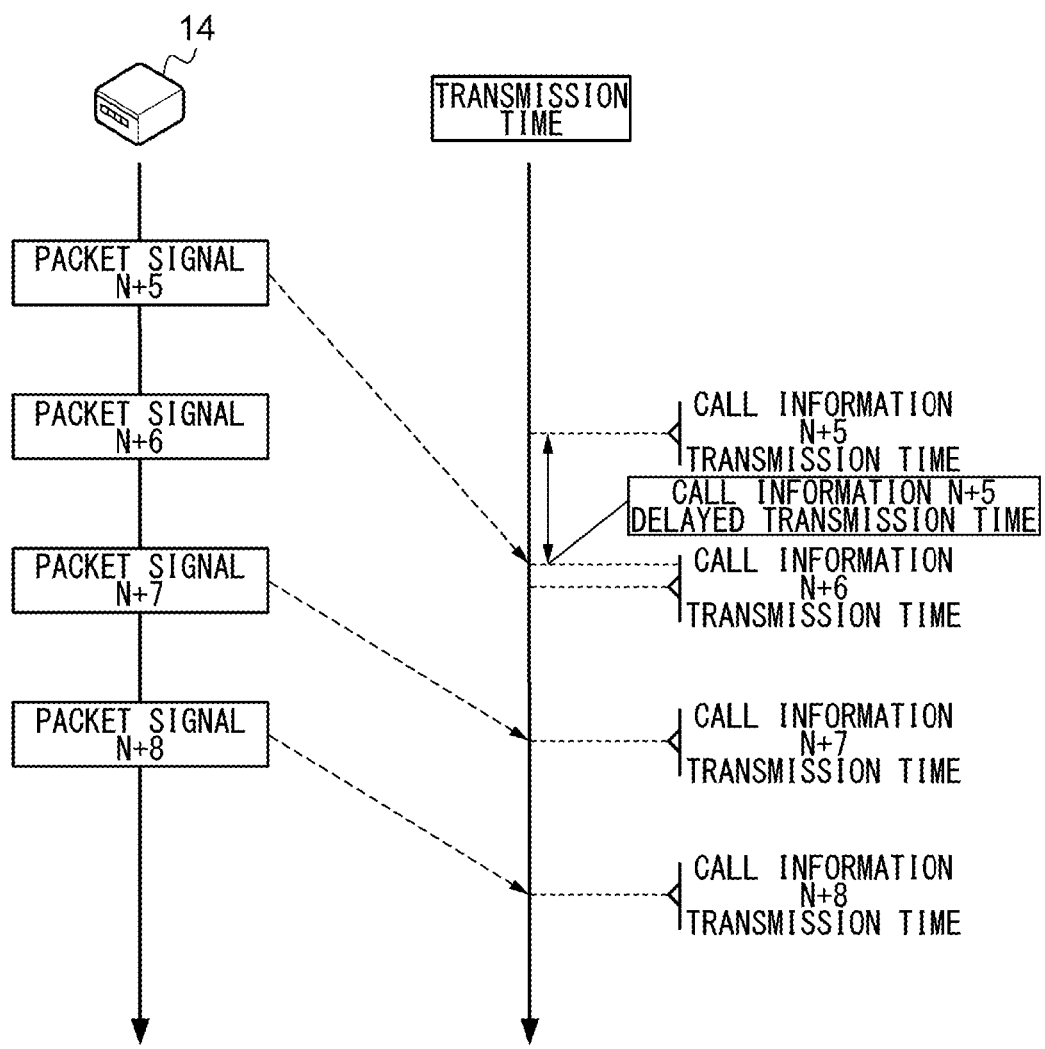
FIG. 13 shows a summary of a transmission process performed by the communication system of FIG. 1.

FIG. 13 shows a summary of a transmission process performed by the communication system 100. By subjecting the packet signal N+5 to the above-described process performed when a delay occurs, the call information N+5 is transmitted at the call information N+5 delayed transmission time. It is assumed that the call information N+6 included in the packet signal N+6 is a silent segment. The delay duration Δt is updated accordingly so that the delay duration Δt becomes "0". This causes the call information N+7 in the packet signal N+7 to be transmitted at the call information N+7 transmission time. In this way, the delay is eliminated. In this process, the wireless transmitter 40 uses the transmission power in the normal situation again. Similarly, N+8 and the subsequent call information are transmitted at the transmission time designated by the control apparatus 12 instead of the delayed transmission time.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 14:
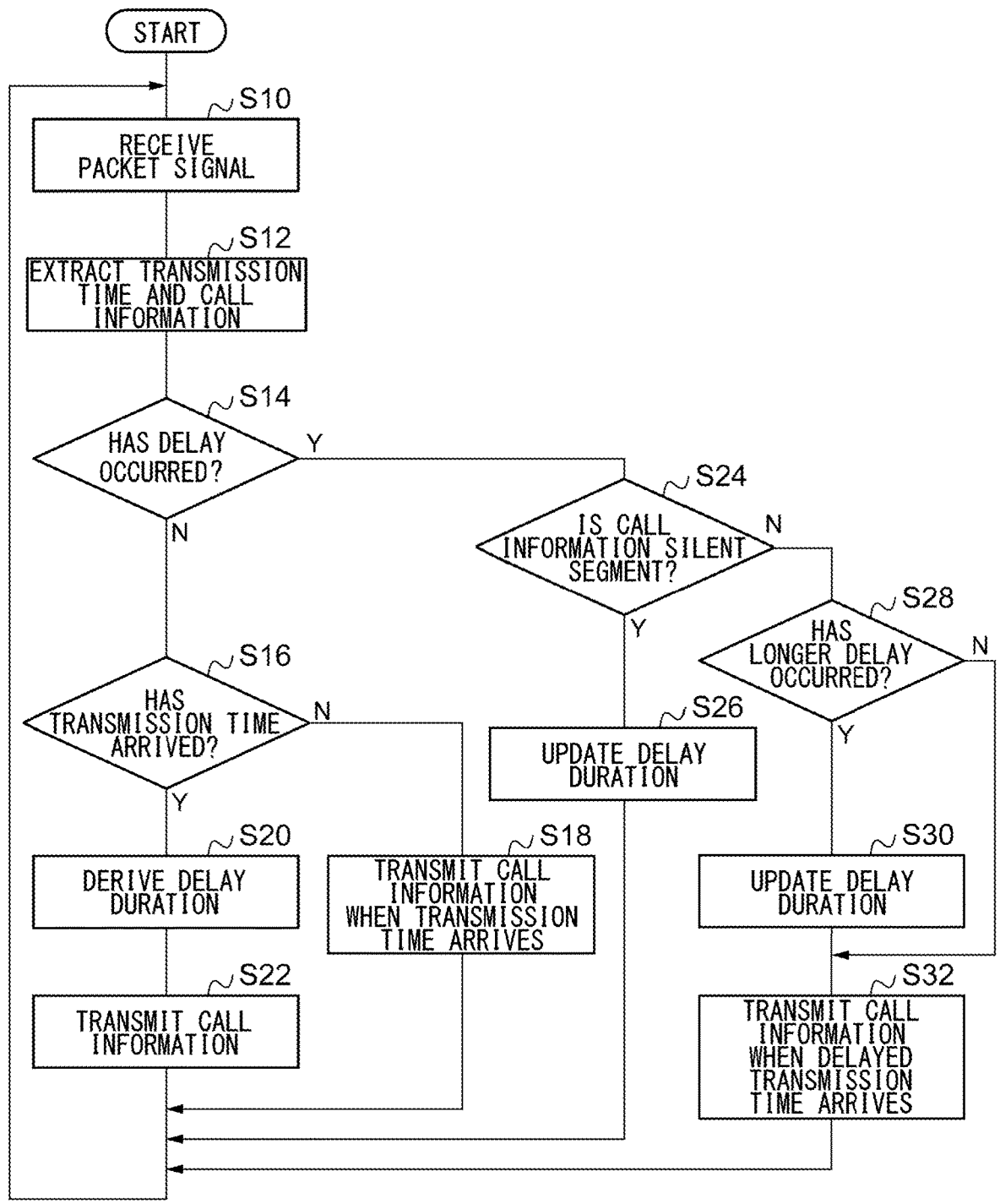
FIG. 14 is a flowchart showing a transmission process performed by the base station apparatus of FIG. 8.

A description will be given of the operation of the communication system 100 configured as described above. FIG. 14 is a flowchart showing a transmission process performed by the base station apparatus 14. The communication interface 32 receives a packet signal (S10). The processor 38 extracts the transmission time and the call information (S12). The processor 38 determines whether a delay has occurred (delay state) (S14). A delay state is a state in which a delay has already occurred in the packet signal preceding the packet signal N received in S10. When a delay has not occurred (N in S14), control proceeds to S16. When a delay has occurred (Y in S14), control proceeds to S24. The processor 38 compares the reference time and the transmission time and determines whether the transmission time has already passed (S16). When the transmission time has not arrived (N in S16), control proceeds to S18. When the transmission time has already passed (Y in S16), control proceeds to S20. The processor 38 and the wireless transmitter 40 transmit the call information when the transmission time has arrived (S18). Control is returned from S18 to S10, and the process is repeated. The processor 38 derives a delay duration and establishes a delay state (S20). Subsequently, the wireless transmitter 40 transmits the call information (S22). In other words, when a transition is made from a non-delay state to a delay state, the call information is transmitted when the packet signal including the call information is received. Control is returned from S22 to S10, and the process is repeated.

The processor 38 determines whether the call information included in the packet signal is a silent segment (S24). When the call information is a silent segment (Y in S24), control proceeds to S26. When the call information is not a silent segment (N in S24), control proceeds to S28. The processor 38 updates the delay duration (S26). In other words, the processor 38 reduces the delay duration in proportion to the duration of the silent segment. Control is returned from S26 to S10, and the process is repeated. In other words, the call information that is a silent segment is not transmitted.

The processor 38 determines whether a delay longer than the currently configured delay duration has occurred (S28). When a longer delay has occurred (Y in S28), control proceeds to S30. When a longer delay has not occurred (N in S28), control proceeds to S32. The processor 38 updates the delay duration (S30). In other words, the processor 38 calculates a difference between the reference time and the transmission time and defines the difference to be a new delay duration. The processor 38 and the wireless transmitter 40 transmit the call information when the delayed transmission time configured based on the delay duration arrives (S32). Control is returned from S32 to S10, and the process is repeated.

According to the embodiment, the delay duration is derived when the transmission time extracted from the packet signal has already passed. The call information is transmitted at the time derived by adding the delay duration to the transmission time extracted from the subsequent packet signal. Therefore, transmission of the call information at regular intervals is maintained. Further, since transmission of the call information at regular intervals is maintained, the continuity of playback of speech in the terminal apparatus is maintained. Since the continuity of playback of speech in the terminal apparatus is maintained, any impact of an unexpected delay that may occur on the communication quality is reduced.

Further, since the transmission power in the delay situation is configured to be smaller than the transmission power in the normal situation, the interference affecting the base station apparatus in which a delay does not occur (the base station that performs a transmission process at the scheduled transmission time) is reduced. Since the interference affecting the base station in which a delay does not occur is reduced, the quality of speech played back in the terminal apparatus is inhibited from being degraded. In other words, the communication quality is inhibited from being lowered. Further, when a silent segment is included in the call information at the time of delayed transmission, transmission of the silent segment is skipped, and the delay duration is reduced so that the transmission delay of the call information is reduced. Detection of a silent segment is made in units of the call information so that the process is simplified.

The communication area of the base station apparatus performing a delayed transmission process will not overlap the communication area of another base station apparatus. Therefore, the occurrence of interference in a portion where the communication areas overlap is inhibited. Since the call information included in the delayed packet signal is not discarded, the occurrence of interrupted speech in the terminal apparatus is prevented. Further, the communication quality is inhibited from being lowered in the event of any delay difficult to predict accurately that may occur in the IP network.

Described above is an explanation based on an exemplary embodiment. The embodiment is intended to be illustrative only and it will be understood by those skilled in the art that various modifications to constituting elements and processes could be developed and that such modifications are also within the scope of the present invention.

According to the embodiment, the professional radio system is used in the communication system 100. Alternatively, a wireless communication system other than the professional radio system, such as a cellular phone system, may be used. According to this variation, the flexibility of the system is improved.

According to the embodiment, the control apparatus 12 is configured to be separate from the base station apparatus 14 and is connected to the base station apparatus 14 via the IP network 10. Alternatively, the control apparatus 12 may be included in and integrated with the base station apparatus 14. According to this variation, the flexibility in the configuration can be improved.

According to the embodiment, the transmission time is used by the control apparatus 12 as a parameter to designate the timing of transmitting the call information. Alternatively, a counter value derived based on a pulse per second (PPS) signal obtained from the synchronization control reference apparatus 20 may be used. According to this variation, the flexibility in the configuration can be improved.

In the embodiment, the IP network 10 is described by way of example. Alternatively, other networks where the transmission delay time over the network varies may be used. According to this variation, the flexibility in the configuration can be improved.

According to the embodiment, the delay duration $\Delta t$ is used to derive the delayed transmission time until a silent segment is detected during delayed transmission. Alternatively, another method may be used to detect the delay duration $\Delta t$. The speech information in the call information may be compressed in time by using a technology such as speech speed conversion to reduce the time required for transmission as compared to normal time and may reduce the delay duration $\Delta t$ in accordance with the reduced time. According to this variation, the flexibility in configuring the system can be improved.

According to the embodiment, the transmission power configuration table in the storage 44 includes two types of transmission power adapted to the normal situation and the delay situation. Alternatively, the transmission power configuration table may include three or more types of transmission power. In a wireless system in which a reception failure in the terminal apparatus 16 occurs on multiple levels depending on the duration of the delay time, a medium-degree transmission power may be used in the case of a medium-degree delay time, and a smaller transmission power may be used in the case of a longer delay time. According to this variation, the flexibility in configuring the system can be improved.

What is claimed is:

1. A base station apparatus comprising:
a receiver that receives data at least including speech information and information related to a transmission time when the speech information should be transmitted;
a processor that extracts the speech information and the transmission time included in the data received by the receiver;
a storage that stores a transmission power configuration table that lists a transmission power in a normal situation and a transmission power in a delay situation configured to be smaller than the transmission power in the normal situation; and a transmitter that transmits the speech information extracted by the processor based on the transmission time extracted by the processor, wherein the transmitter uses, based on the transmission power configuration table, the transmission power in the normal situation to transmit the speech information when the transmission time arrives and uses the transmission power in the delay situation to transmit the speech information at a time later than the transmission time to reduce interference with a signal transmitted from another base station apparatus, and when the transmission time has already passed, the transmitter transmits the speech information and transmits the speech information extracted from subsequent data that follows the data at a time later than the transmission time extracted from the subsequent data.

2. The base station apparatus according to claim 1, wherein when the extracted transmission time has already passed, the processor derives a delay duration elapsed since the transmission time, and when a time derived by adding the delay duration to the transmission time extracted from the subsequent data arrives, the transmitter transmits the speech information extracted from the subsequent data.

3. The base station apparatus according to claim 2, wherein when a differential value derived by subtracting the transmission time included in the data from a time that the data is received is larger than the delay duration, the difference value is defined as a new delay duration.

4. A base station apparatus comprising:

a receiver that receives data at least including speech information and information related to a transmission time when the speech information should be transmitted;

a processor that extracts the speech information and the transmission time included in the data received by the receiver;

a transmitter that transmits the speech information extracted by the processor based on the transmission time extracted by the processor, wherein when the extracted transmission time has already passed, the processor derives a delay duration elapsed since the transmission time, and when a silent segment is included in the speech information included in the data received by the receiver, the processor reduces the delay duration in accordance with a duration of the silent segment, when the transmission time has already passed, the transmitter transmits the speech information and when a time derived by adding the delay duration to the transmission time extracted from subsequent data that follows the data arrives, the transmitter transmits the speech information extracted from the subsequent data, and the transmitter transmits the speech information, excluding the silent segment.

5. The base station apparatus according to claim 4, wherein the processor detects a silent segment in units of the speech information included in the data received by the receiver.

6. A non-transitory computer-readable medium encoded with a program comprising computer-implemented modules including:

a reception module that receives data at least including speech information and information related to a transmission time when the speech information should be transmitted;

an extraction module that extracts the speech information and the transmission time included in the data received; and a transmission module that transmits the speech information extracted based on the transmission time extracted, wherein the transmission module uses, based on a transmission power configuration table that lists a transmission power in a normal situation and a transmission power in a delay situation configured to be smaller than the transmission power in the normal situation, the transmission power in the normal situation to transmit the speech information when the transmission time arrives and uses the transmission power in the delay situation to transmit the speech information at a time later than the transmission time to reduce interference with a signal transmitted from another base station apparatus, and when the transmission time has already passed, the transmission module transmits the speech information and transmits the speech information extracted from subsequent data that follows said data at a time later than the transmission time extracted from the subsequent data.

7. The base station apparatus according to claim 1, wherein when a silent segment is included in the speech information included in the data received by the receiver, the processor reduces the delay duration in accordance with a duration of the silent segment, and the transmitter transmits the speech information, excluding the silent segment.

8. The base station apparatus according to claim 4, wherein the transmitter configures a transmission power used to transmit the speech information at the time later than the transmission time to be smaller than a transmission power used to transmit the speech information when the transmission time arrives.

* * * * *